United States Patent Office 3,790,572
Patented Feb. 5, 1974

3,790,572
2-HYDROXYALKYL-4,5-DIHYDROPYRIDAZIN-3(2H)-ONE DERIVATIVES
William J. Houlihan, Mountain Lakes, N.J., assignor to Sandoz-Wander, Inc., Hanover, N.J.
No Drawing. Continuation-in-part of application Ser. No. 242,796, Apr. 10, 1972, which is a continuation-in-part of application Ser. No. 178,815, Sept. 8, 1971, both now abandoned. This application Aug. 14, 1972, Ser. No. 280,670
Int. Cl. C07d 51/04
U.S. Cl. 260—250 A   9 Claims

ABSTRACT OF THE DISCLOSURE

Derivatives of 2-hydroxyalkyl-6-aryl or heterocyclic substituted-4,5-dihydropyridazin-3(2H)-ones, e.g., 6-(p-chlorophenyl)-2-(2-N-methylcarbamoyloxybutyl)-4,5-dihydropyridazin-3(2H)-one are prepared by reacting 2-hydroxyalkyl-6-substituted-4,5-dihydropyridazin-3(2H)-ones with organic acid halides or anhydrides, isocyanates, dihydrofuran or dihydropyran or by treating 2-alkoxycarbonyl halide-6-substituted-4,5-dihydropyridazin-3(2H)-one with amines and are useful as central nervous depressants.

---

This application is a continuation-in-part of U.S. patent application Ser. No. 242,796, filed Apr. 10, 1972, now abandoned, which in turn is a continuation-in-part of U.S. patent application Ser. No. 178,815, filed Sept. 8, 1971, now abandoned.

This invention relates to derivatives of 4,5-dihydropyridazin-3(2H)-one. More particularly, it relates to 2-hydroxyalkyl-6-aryl or heterocyclic substituted-4,5-dihydropyridazin-3(2H)-one derivatives, to methods for their preparation and to their use as minor tranquilizers.

The compounds of this invention may be represented by the following formula:

$$\underset{\text{(I)}}{A\text{—pyridazinone}\text{—N—(CH}_2\text{)}_n\text{—CHOR}^2 \text{ with } R^1}$$

where $n$ is 1, 2, 3 or 4; and
$R^1$ represents hydrogen or lower alkyl, i.e., alkyl having 1 to 4 carbon atoms, e.g., methyl, ethyl, or isopropyl; and
$R^2$ represents 2-dihydrofuranyl; 2-dihydropyranyl; lower alkanoyl, i.e., alkanoyl having 2 to 5 carbon atoms, e.g., acetyl, propanoyl and the like; or carbamoyl of the formula $$-\overset{O}{\underset{}{\text{C}}}-N\overset{R^3}{\underset{R^4}{}}$$

where $R^3$ and $R^4$ each, independently, represent hydrogen or lower alkyl as defined above and
A represents

[aryl/heterocyclic structures: phenyl with $R^5$, $R^6$; thienyl; furanyl; or pyridyl]

where $R^5$ and $R^6$ each, independently, represent hydrogen or halo having an atomic weight of 19 to 36.

The preferred compounds are those in which $R^2$ is carbamoyl and A is p-chlorophenyl.

The compounds of Formula I where $R^2$ is alkanoyl or carbamoyl are prepared in accordance with the following process:

$$\underset{\text{(III)}}{A\text{—}N\text{—(CH}_2\text{)}_n\text{—CHOH}} + \underset{\text{(II)}}{X\text{—}R^7} \longrightarrow \underset{\text{(Ia)}}{A\text{—}N\text{—(CH}_2\text{)}_n\text{—CHOR}^7}$$

where X is halo having an atomic weight of about 35 to 80;
$R^7$ is $$-\overset{O}{\underset{}{\text{C}}}-R^3 \text{ or } -\overset{O}{\underset{}{\text{C}}}-N\overset{R^3}{\underset{R^4}{}}$$

where $R^3$ is lower alkyl as defined above or
X—$R^7$ is $$R^3-\overset{O}{\underset{}{\text{C}}}-O-\overset{O}{\underset{}{\text{C}}}-R^3$$

and
$n$, A, $R^1$, $R^3$ and $R^4$ are as previously defined.

The compounds of Formula Ia are prepared by treating a compound of Formula III with a compound of Formula II in an inert solvent. Although the particular solvent used is not critical, pyridine, ethers, such as tetrahydrofuran or ethyl ether, aromatic hydrocarbon solvents, such as benzene, toluene and xylene and halogenated hydrocarbon solvents such as methylene dichloride or chloroform are preferred, especially tetrahydrofuran. When X—$R^7$ is an acid anhydride, pyridine is the preferred solvent. In order to remove halide when generated by the reaction, a free base, e.g., sodium carbonate, pyridine, diethylamine and preferably potassium carbonate is added to the reactants. The reaction temperature is not critical but the reaction is normally carried out at a temperature from about 50° to 200° C., preferably at the reflux temperature of the reactants. The reaction time may vary widely and is usually in the range of 6-24 hours. Recovery of the compounds of Formula Ia may be affected using conventional techniques, e.g., filtration, recrystallization and evaporation.

Compounds of the Formula Ia in which $R^2$ is $$-\overset{O}{\underset{}{\text{C}}}-\text{NHR}^3$$

can be prepared according to the following reaction scheme:

$$\underset{\text{(III)}}{A\text{—}N\text{—(CH}_2\text{)}_n\text{—CHOH}} + R^3\text{NCO} \longrightarrow$$

$$\underset{\text{(Ib)}}{A\text{—}N\text{—(CH}_2\text{)}_n\text{—CHO}\text{—}\overset{O}{\underset{}{\text{C}}}\text{—NHR}^3}$$

where $n$, A, $R^1$, and $R^3$ are as previously defined.

The compounds of Formula Ib are prepared by treating a compound of Formula III with a compound of Formula IV using the same reaction conditions set out above for the preparation of a compound of Formula Ia with the exception that a free base is not required in the reaction.

The compounds of Formula I in which $R^2$ is 2-dihydrofuranyl or 2-dihydropyranyl may be obtained according to the following process:

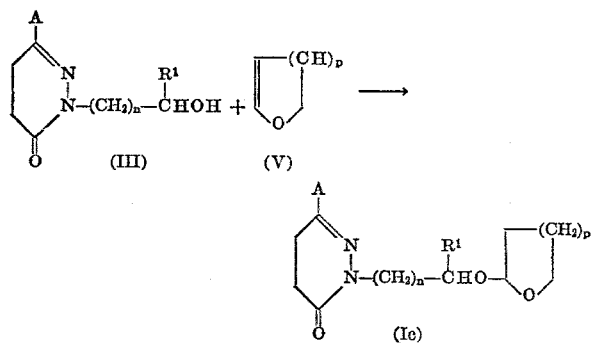

where $p$ is 1 or 2 and $n$, A and $R^1$ are as previously defined.

The compounds of Formula Ic are prepared by treating a compound of the Formula III with a compound of the Formula V under acidic conditions. Although a solvent is not necessary, the reaction may be carried out in the presence of inert solvents or preferably in excess dihydrofuran or dihydropyran. The temperatures and the time of the reaction are not critical. However, the reaction is normally carried out at a temperature of from about 0° to 150° C., preferably at the reflux temperature of the medium, and the time is usually in the range of from about 6 to 30 hours. Recovery of the compounds of Formula Ic may be affected using conventional techniques, e.g., recrystallization, evaporation, or column chromatography.

The compounds of Formula I in which $R^2$ is carbamoyl and both $R^3$ and $R^4$ are other than hydrogen may be prepared in accordance with the following reaction scheme:

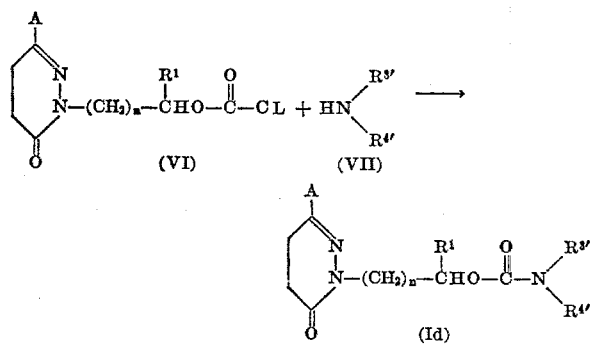

where $R^{3'}$ and $R^{4'}$ each independently represent lower alkyl as defined above and
$n$, A and $R^1$ are as previously defined.

The compounds of Formula Id are prepared by treating a compound of Formula VI with a compound of Formula VII in an inert organic solvent. The particular inert organic solvent used is not critical, but preferred solvents are pyridine, ethers, such as tetrahydrofuran and ethyl ether, aromatic hydrocarbons, such as benzene, toluene and xylene and halogenated hydrocarbons, such as methylene dichloride and chloroform. The reaction is conveniently carried out at a temperature of from 0° to 200° C., preferably at room temperature. It is also preferred that an agent be added to bind the hydrohalic acid formed in the reaction, such as sodium or potassium carbonate, pyridine or especially excess amine (VII). The reaction time is not critical, and under preferred conditions is about 6 to 24 hours. The product (Id) is recovered by conventional techniques e.g., distillation or crystallization.

The compounds of Formula III are prepared in accordance with the following process:

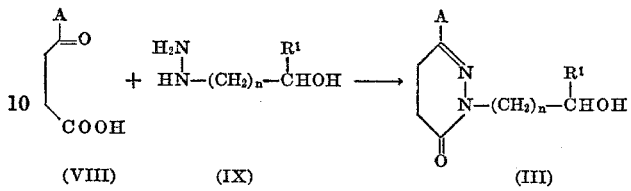

where $n$, $R^1$ and A are as set out above.

The compounds of Formula III are prepared by condensing a γ-ketobutyric acid of Formula VIII with a 1-hydrozinoalkanol of Formula IX in an inert solvent. The preferred inert solvents are the aromatic and chloro substituted aromatic hydrocarbons, especially toluene, xylene, chlorobenzene and dichlorobenzene. The condensation may be carried out by heating a mixture of a compound of Formula VIII and a compound of Formula IX in an inert solvent at temperatures of from about 60° to 200° C., preferably at the reflux temperature of the system. Neither the particular solvent nor the temperature at which the reaction is carried out is critical.

The condensation can also be carried out in the presence of an acid catalyst, such as an arylsulfonic acid, e.g., para-toluene sulfonic acid monohydrate. Preferably, the water formed during the reaction is removed by selecting a solvent which forms an azeotrope with water, but is water immiscible, thereby permitting use of a Dean-Stark tube to remove the water from the reaction system. While compounds of Formula VIII, theoretically react with compounds of Formula IX in a molar ratio of 1:1 to form the corresponding compounds of Formula III, it is preferred that the condensation be carried out using a molar excess of the compound of Formula IX. The final product is recovered by conventional techniques, e.g., evaporation and recrystallization.

The compounds of Formula VI are prepared by standard techniques, for example, by treating the compound of Formula III with phosgene in an inert solvent such as aromatic hydrocarbons, ethers and the like at a temperature between room temperature and the reflux temperature of the system for a period of 6 to 24 hours. An acid binding agent such as triethylamine is included in the reaction to bind any hydrogen halide liberated during the process.

The compounds of Formula V and many of the compounds of Formulas II, IV, VII, VIII, and IX are known and can be prepared by methods described in the literature. The compounds of Formulas II, IV, VI, and VIII not specifically disclosed can be prepared by analogous methods from known starting materials.

The compounds of Formula I are useful because they possess pharmacological activity in animals. In particular, the compounds are useful as central nervous system depressants, especially as sedative hypnotics and minor tranquilizers as indicated (1) by their ability to produce docility in behavior tests in mice tested according to the 30-word adjective check sheet system basically as described by Irwin S. (Gordon Research Conference Medicinal Chemistry 1959) and Chen (Symposium on Sedative and Hypnotic Drugs, Williams and Wilkins, 1954); (2) by the method of Orloff et al. (Proc. Soc. Exp. Biol., 70: 254, 1949) using mice in which convulsive seizures are chemically induced with strychnine and metrazole; (3) by the hexobarbital reinduction method of Winter (J. Pharmacol & Exp. Therap., 97:7, 1948) and (4) by their ability to depress spinal reflexes in male cats as measured by flexor and patellar responses using force displacement transducers.

The compounds of Formula I may be combined with a pharmaceutically acceptable carrier or adjuvant and may be administered orally or parenterally. For this use, the dosage will vary depending upon the mode of administration utilized and the particular compound employed. However, in general, satisfactory results are obtained when the compounds are administered at a daily dosage of from about 1 milligram to 250 milligrams per kilogram of animal body weight. This daily dosage is preferably given in divided doses, e.g., 2 to 4 times a day, or in sustained release form. For most large mammals, the total daily dosage is from about 70 to 3000 milligrams and dosage forms suitable for internal administration comprise from about 17.5 milligrams to about 1500 milligrams of the compound in admixture with a solid or liquid pharmaceutical carrier or diluent.

A representative formulation suitable for oral administration is a tablet or capsule prepared by standard techniques which contain the following and may be administered two to four times a day in the treatment of anxiety and depression.

| Ingredients | Weight (mg.) | |
|---|---|---|
| | Tablet | Capsule |
| 6-(p-chlorophenyl)-2-(2-N-methyl carbamoyl-oxybutyl)-4,5-dihydropyridazin-3(2H)-one | 50 | 50 |
| Tragacanth | 10 | |
| Lactose | 197.5 | 250 |
| Cornstarch | 25 | |
| Talcum | 15 | |
| Magnesium stearate | 2.5 | |

The following pharmaceutical compositions are formulated with the indicated amount of active agent using conventional techniques. The injectable suspension is suitable for administration once or twice a day whereas the oral liquid suspension is suitable administered 2 to 4 times per day in the treatment of anxiety and depression:

| Ingredients | Weight (mg.) | |
|---|---|---|
| | Sterile injectable suspension | Oral liquid suspension |
| 6-(p-chlorophenyl)-2-(2-N-methyl-carbamoyl-oxybutyl)-4,5-dihydro-pyridazin-3(2H)-one | 100 | 100 |
| Sodium carboxy methyl cellulose, USP | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | Q.s. |
| Color | | Q.s. |
| Methyl paraben, USP | | 4.5 |
| Propyl paraben, USP | | 1.0 |
| Polysorbate 80 (e.g. Tween 80), USP | | 5 |
| Sorbitol solution, 70%, USP | | 2,500 |
| Buffer agent to adjust pH for desired stability | Q.s. | Q.s. |
| Water | (1) | (2) |

1 For injection q.s. to 1 ml.
2 Q.s. to 5 ml.

EXAMPLE 1

6-(p-chlorophenyl)-2-(2-hydroxybutyl)-4,5-dihydropyridazin-3(2H)-one

To a flask equipped with a condenser, Dean-Stark tube and stirrer is added 10.6 g. (0.05 mole) of 3-(p-chlorobenzoyl)-propionic acid, 6.2 g. (0.06 mole) of 1-hydrazino-2-butanol and 250 ml. of toluene. The mixture is stirred and refluxed until water ceases to separate in the Dean-Stark tube. The solvent is then removed in vacuo on a rotary evaporator and the residue is crystallized from ether to obtain 6-(p-chlorophenyl)-2-(2-hydroxybutyl)-4,5-dihydropyridazin-3(2H)-one; M.P. 95.5° to 97° C.

Following the above procedure, but using an equivalent amount of 3-(3,4-dichlorobenzoyl)-propionic acid;
3-(2-thenoyl)-propionic acid;
3-(2-furoyl)-propionic acid or
3-(2-picolinoyl)-propionic acid in place of the 3-(p-chlorobenzoyl)-propionic acid, there is obtained 6-(3,4-dichlorophenyl)-2-(2-hydroxybutyl)-4,5-dihydropyridazin-3(2H)-one;
6-(2-thienyl)-2-(2-hydroxybutyl)-4,5-dihydropyridazin-3(2H)-one;
6-(2-furyl)-2-(2-hydroxybutyl)-4,5-dihydropyridazin-3(2H)-one; or
6-(2-pyridyl)-2-(2-hydroxybutyl)-4,5-dihydropyridazin-3(2H)-one, respectively.

EXAMPLE 2

6-(p-chlorophenyl)-2-(2-N-methyl-carbamoyloxybutyl)-4,5-dihydropyridazin-3(2H)-one To a flask equipped with a stirrer and condenser and protected from moisture with a calcium chloride drying tube is charged 5 g. (0.018 mole) of 6-(p-chlorophenyl)-2-(2 - hydroxybutyl) - 4,5 - dihydropyridazin-3(2H)-one and 5 ml. methyl isocyanate in 100 ml. of dry tetrahydrofuran. The mixture is stirred and refluxed for about 15 hours and then the solvent is removed in vacuo on a rotary evaporator to yield 6-(p - chlorophenyl)-2-(2-N-methylcarbamoyloxybutyl) - 4,5 - dihydropyridazin - 3-(2H)-one; M.P. 80–83° C.

Using an equivalent amount of 6-(3,4-dichlorophenyl)-2-(2-hydroxybutyl)-4,5-dihydropyridazin-3(2H)-one;
6-(2-thienyl)-2-(2-hydroxybutyl)-4,5-dihydropyridazin-3(2H)-one;
6-(2-furyl)-2-(2-hydroxybutyl)-4,5-dihydropyridazin-3(2H)-one; or
6-(2-pyridyl)-2-(2-hydroxybutyl)-4,5-dihydropyridazin-3(2H)-one in place of the 6-(p-chlorophenyl)-2-(2-hydroxybutyl)-4,5-dihydropyridazin-3(2H)-one above there is obtained 6-(3,4-dichlorophenyl)-2-(2-N-methyl-carbamoyloxybutyl)-4,5-dihydropyridazin-3(2H)-one (M.P. 100.5°–102° C.);
6-(2-thienyl)-2-(2-N-methyl-carbamoyloxybutyl)-4,5-dihydropyridazin-3(2H)-one (B.P. 180° C. at 0.3 mm.);
6-(2-furyl)-2-(2-N-methyl-carbamoyloxybutyl)-4,5-dihydropyridazin-3(2H)-one; or
6-(2-pyridyl)-2-(2-N-methyl-carbamoyloxybutyl)-4,5-dihydropyridazin-3(2H)-one, respectively.

EXAMPLE 3

6-(p-chlorophenyl)-2-(2-N,N-dimethylcarbamoyloxybutyl)-4,5-dihydropyridazin-3(2H)-one In a flask equipped with a stirrer and condenser, there is placed 5 g. (0.018 mole) of 6-(p-chlorophenyl)-2-(2-hydroxybutyl)-4,5-dihydropyridazin-3(2H)-one and 5 ml. of dimethylcarbamoyl chloride to which is added 3.5 g. (0.036 mole) of anhydrous potassium carbonate in 100 ml. of dry tetrahydrofuran. The reaction mixture is stirred and refluxed for about 18 hours. The residue is filtered off and the filtrate is then concentrated in vacuo on a rotary evaporator to give 6-(p-chlorophenyl)-2-(2-N,N-dimethylcarbamoyloxybutyl) - 4,5 - dihydropyridazin-3(2H)-one.

Following the above procedure and using an equivalent amount of 6-(3,4-dichlorophenyl)-2-(2-hydroxybutyl)-4,5-dihydropyridazin-3(2H)-one;
6-(2-thienyl)-2-(2-hydroxybutyl)-4,5-dihydropyridazin-3(2H)-one;

6-(2-furyl)-2-(2-hydroxybutyl)-4,5-dihydropyridazin-3(2H)-one; or 6-(2-pyridyl)-2-(hydroxybutyl)-4,5-dihydropyridazin-3(2H)-one in place of the 6-(p-chlorophenyl)-2-(2-hydroxybutyl)-4,5-dihydropyridazin-3(2H)-one, there is obtained 6-(3,4-dichlorophenyl)-2-(2-N,N-dimethylcarbamoyloxybutyl)-4,5-dihydropyridazin-3(2H)-one (B.P. 210° C. at 0.6 mm.);

6-(2-thienyl)-2-(2-N,N-dimethylcarbamoyloxybutyl)-4,5-dihydropyridazin-3(2H)-one (B.P. 155° C. at 0.3 mm.);

6-(2-furyl)-2-(2-N,N-dimethylcarbamoyloxybutyl)-4,5-dihydropyridazin-3(2H)-one; or 6-(2-pyridyl)-2-(2-N,N-dimethylcarbamoyloxybutyl)-4,5-dihydropyridazin-3(2H)-one, respectively.

The 6-p-chlorophenyl) - 2 - (2-N-methylcarbamoyloxybutyl)-4,5-dihydropyridazin-3(2H)-one of this example is an effective sedative hypnotic and minor tranquilizer when orally administered to an animal suffering from anxiety and tension at a dosage of 50 milligrams two to four times per day.

EXAMPLE 4

6-(p-chlorophenyl-2-[2-(2-tetrahydropyranyloxy)butyl]-4,5-dihydropyridazin-3(2H)-one To a mixture of 5.6 g. (0.02 mole) of 6-(p-chlorophenyl)-2-(2 - hydroxybutyl) - 4,5 - dihydropyridazin-3(2H)-one and 25 ml. of dihydropyran is added one drop of concentrated HCl, and the mixture is refluxed for 20 hours. The cooled reactant mixture is shaken with 2 g. of the sodium bicarbonate, filtered and the solvent removed in vacuo. The residue is purified by elution through a column of silica gel to give pure 6-(p-chlorophenyl)-2-[2-(2-tetrahydropyranyloxy)butyl] - 4,5 - dihydropyridazin-3(2H)-one as a liquid.

Following the above procedure but using an equivalent amount of dihydrofuran in place of dihydropyran there is obtained 6-(p - chlorophenyl-2-[2-(2-tetrahydrofuranyloxy)butyl]4,5-dihydropyridazin-3(2H)-one.

EXAMPLE 5

6-(p-chlorophenyl)-2-(2-acetoxybutyl)-4,5-dihydropyridazin-3(2H)-one

A mixture of 5.6 g. (0.02 mole) of 6-(p-chlorophenyl)-2-(2-hydroxybutyl)-4,5-dihydropyridazin-3(2H)-one and 2.55 g. acetic anhydride is added to 50 ml. pyridine and refluxed for 20 hours. The solvent is then removed in vacuo, and the residue is dissolved in chloroform, extracted with 50 ml. aqueous sodium bicarbonate solution, dried over sodium sulfate, filtered and evaporated in vacuo. The residue is purified by elution through a column of silica gel and then crystallized from etherchloroform (1:1) to give 2-(2-acetoxybutyl)-6-(p-chlorophenyl)-4,5-dihydropyridazin-3(2H)-one; M.P. 86–88° C.

Following the procedure of this example but using an equivalent amount of 6 - (3,4 - dichlorophenyl)-2-(2-hydroxybutyl)-4,5-dihydropyridazin-3(2H)-one in place of the 6-(p-chlorophenyl) - 2 - (2-hydroxybutyl)-4,5-dihydropyridazin-3(2H)-one, there is obtained 6-(3,4-dichlorophenyl) - 2 - (2-acetoxybutyl)-4,5-dihydropyridazin-3(2H)-one; 58 to 60° C.

EXAMPLE 6

6-(p-chlorophenyl)-2-(2-N-methylcarbamoyloxypropyl)-4,5-dihydropyridazin-3(2H)-one Following the procedure of Example 1, but using an equivalent amount of 1-hydrazino-2-ethanol, 1-hydrazino-2-propanol or 1-hydrazino-4-butanol in place of 1-hydrazino-2-butanol, there is obtained 6-(p-chlorophenyl)-2-(2-hydroxyethyl)-4,5-dihydropyridazin-3(2H)-one;

6-(p-chlorophenyl-2-(2-hydroxypropyl)-4,5-dihydropyridazin-3(2H)-one or 6-(p-chlorophenyl)-2-(4-hydroxybutyl)-4,5-dihydropyridazin-3(2H)-one respectively.

Following essentially the procedure of Example 2, 9.8 g. (0.037 mole) of 6-(p-chlorophenyl)-2-(2-hydroxypropyl)-4,5-dihydropyridazin-3(2H)-one in 200 ml. pyridine is added to 10.0 ml. (0.162 mole) of methyl isocyanate. The mixture is then refluxed 18 hours, and cooled. The solvent is removed in vacuo and the residue is crystallized by treatment with ether after which it is recrystallized from aqueous isopropanol to give 6-((p-chlorophenyl)-2-(2-N-methylcarbamoyloxypropyl) - 4,5 - dihydropyridazin-3(2H)-one (M.P. 123–124° C.).

Following the above procedure and using an equivalent amount of 6-(p-chlorophenyl) - 2 - (2-hydroxyethyl)-4,5-dihydropyridazin-3(2H)-one or 6-(p-chlorophenyl)-2-(4-hydroxybutyl) - 4,5 - dihydropyridazin-3(2H)-one in place of the 6-(p-chlorophenyl)-2-(2-hydroxypropyl)-4,5-dihydropyridazin-3(2H)-one, there is obtained 6-(p-chlorophenyl) - 2 - (2-N-methyl - carbamoyloxyethyl)-4,5-dihydropyridazin-3(2H)-one (M.P. 123°–124° C.) or 6-(p-chlorophenyl) - 2-(4-N-methylcarbamoyloxybutyl)-4,5-dihydropyridazin-3(2H)-one (88° to 89.5° C.).

The 6-(p-chlorophenyl) - 2 - (4-N-methyl-carbamoyloxybutyl)-4,5-dihydropyridazin-3(2H)-one of this example is an effective sedative hypnotic and minor tranquilizer when orally administered to an animal suffering from anxiety and tension at a dosage of 50 milligrams two to four times per day.

EXAMPLE 7

6-(p-chlorophenyl)-2-(2,N,N-dimethylcarbamoyloxybutyl)-4,5-dihydropyridazin-3-(2H)-one A solution of 5.0 g. (0.0178 mole) of 6-(p-chlorophenyl)- 2-(2-hydroxybutyl)-4,5-dihydropyridazin-3(2H)-one in 25 ml. anhydrous benzene is added dropwise to a cold solution of 100 ml. (0.073 mole) of phosgene (12.5% in benzene), 1.0 g. (0.020 mole) triethylamine and 100 ml. anhydrous benzene. The mixture is stirred for 2 hours at room temperature and then refluxed for 18 hours. The solvents are removed in vacuo and the residue is dissolved in 100 ml. of benzene. The solution is added in one portion to an ice-cold solution of 16.3 g. (0.362 mole) of dimethylamine in 200 ml. benzene. The mixture is stirred for 18 hours at room temperature, filtered, and the solvent removed in vacuo. The resulting oil is distilled at 155°–160° C. at 0.75 mm. to give 6-(p-chlorophenyl) - 2 - (2-N,N-dimethylcarbamoyloxybutyl)-4,5-dihydropyridazin-3(2H)-one.

Following the above procedure and using an equivalent amount of 6-(3,4-dichlorophenyl)-2-(2-hydroxybutyl)-4,5-dihydropyridazin-3(2H)-one;

6-(2-thienyl)-2-(2-hydroxybutyl)-4,5-dihydropyridazin-3(2H)-one;

6-(2-furyl)-2-(2-hydroxybutyl)-4,5-dihydropyridazin-3(2H)-one; or 6-(2-pyridyl)-2-(2-hydroxybutyl)-4,5-dihydropyridazin-3(2H)-one in place of the 6-(p-chlorophenyl)-2-(2-hydroxybutyl)-4,5-dihydropyridazin-3(2H)-one, there is obtained 6-(3,4-dichlorophenyl)-2-(2-N,N-dimethylcarbamoyloxybutyl)-4,5-dihydropyridazin-3(2H)-one (B.P. 210° C. at 0.6 mm.);

6-(2-thienyl)-2-(2-N,N-dimethylcarbamoyloxybutyl)-4,5-dihydropyridazin-3(2H)-one (B.P. 155° C. at 0.3 mm.);

6-(2-furyl)-2-(2-N,N-dimethylcarbamoyloxybutyl)-4,5-dihydropyridazin-3(2H)-one or 6-(2-pyridyl)-2-(2-N,N-dimethylcarbamoyloxybutyl)-4,5-dihydropyridazin-3(2H)-one, respectively.

What is claimed is:

1. A compound according to claim 1 of the formula:

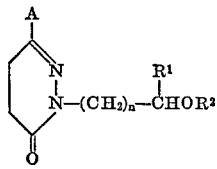

where $n$ is 1, 2, 3 or 4;
$R^1$ represents hydrogen or lower alkyl
$R^2$ represents

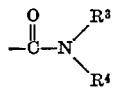

where $R^3$ and $R^4$ each, independently, represents hydrogen or lower alkyl and
A represents

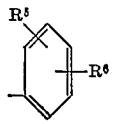

where $R^5$ and $R^6$ each, independently, represents hydrogen or halo having an atomic weight of 19 to 36.

2. A compound according to claim 1 in which A is p-chlorophenyl.

3. The compound of claim 1 which is 6-(p-chlorophenyl)-2-(2-N - methylcarbamoyloxybutyl)-4,5-dihydropyridazin-3(2H)-one.

4. The compound of claim 1 which is 6-(3,4-dichlorophenyl)-2-(2-N - methylcarbamoyloxybutyl)-4,5-dihydropyridazin-3(2H)-one.

5. The compound of claim 1 which is 6-(p-chlorophenyl)-2-(2-N,N-dimethylcarbamoyloxybutyl) - 4,5 - dihydropyridazin-3(2H)-one.

6. The compound of claim 1 which is 6-(3,4-dichlorophenyl)-2-(2-N,N-dimethylcarbamoyloxybutyl) - 4,5 - dihydropyridazin-3-(2H)-one.

7. The compound of claim 1 which is 6-(p-chlorophenyl)-2-(2-N-methylcarbamoyloxypropyl) - 4,5 - dihydropyridazin-3(2H)-one.

8. The compound of claim 1 which is 6-(p-chlorophenyl)-2-(2-N - methylcarbamoyloxyethyl)-4,5-dihydropyridazin-3(2H)-one.

9. The compound of claim 1 which is 6-(p-chlorophenyl)-2-(4-N - methylcarbamoyloxybutyl)-4,5-dihydropyridazin-3(2H)-one.

References Cited

UNITED STATES PATENTS

| | | | |
|---|---|---|---|
| 3,328,403 | 6/1967 | Nitta et al. | 260—250 A |
| 3,341,317 | 9/1967 | Reicheneder et al. | 71—92 |
| 3,663,536 | 5/1972 | Houlihan | 260—239 BC |
| 3,657,242 | 4/1972 | Houlihan | 260—250 A |
| 3,658,814 | 4/1972 | Houlihan | 260—250 A |

NICHOLAS S. RIZZO, Primary Examiner

R. D. McCLOUD, Assistant Examiner

U.S. Cl. X.R.

424—250